United States Patent [19]

Link

[11] 4,407,176

[45] Oct. 4, 1983

[54] FEEDING DEVICE FOR BARSTOCK ON TURNING MACHINES AND THE LIKE

[75] Inventor: Helmut F. Link, Aichwald, Fed. Rep. of Germany

[73] Assignee: Index-Werke KG Hahn & Tessky, Esslingen, Fed. Rep. of Germany

[21] Appl. No.: 277,893

[22] Filed: Jun. 26, 1981

[30] Foreign Application Priority Data

Jun. 30, 1980 [DE] Fed. Rep. of Germany ....... 3024766

[51] Int. Cl.³ ...................... B23B 13/00; B23B 13/02; B23B 13/04; B23B 13/08
[52] U.S. Cl. ........................................ 82/2.5; 82/2.7; 414/17; 414/18
[58] Field of Search ...................... 82/38 R, 38 A, 2.5, 82/2.7; 414/15, 17, 18, 20, 14

[56] References Cited

U.S. PATENT DOCUMENTS 2,619,712 12/1952 Bechler et al. ...................... 82/38 R
2,809,420 10/1957 Bechler ................................ 414/18
2,960,722 11/1960 Freeman .............................. 414/17
3,435,963 4/1969 Jacoby et al. ......................... 414/18
3,955,687 5/1976 Flisch ................................... 82/2.7

FOREIGN PATENT DOCUMENTS

968774 5/1950 France .................................. 414/18
2033264 5/1980 United Kingdom ................. 82/2.7
2080160 2/1982 United Kingdom ................. 82/2.5

*Primary Examiner*—Robert E. Garrett
*Assistant Examiner*—Jerry Kearns
*Attorney, Agent, or Firm*—Shenier & O'Connor

[57] ABSTRACT

A feeding system for barstock on turning machines with a support extending in the feeding direction and with a plurality of holders for holding and slidably guiding a material bar. The holders are slidably guided in the feeding direction on the support and are interconnected by coupling means provided by intersecting links which are pivoted relative to each other and to the holders such that the latter are maintained parallel to each other and can be pushed together and moved apart in the longitudinal direction of the material bar.

14 Claims, 15 Drawing Figures

FEEDING DEVICE FOR BARSTOCK ON TURNING MACHINES AND THE LIKE

DESCRIPTION

Most automatic lathes are adapted to process barstock material of circular, square or hexagon section and with a bar length of several meters. The processing of material bars offers advantages but also disadvantages which apply to present-day high-speed machines with a high machining accuracy. On the one hand, barstock permits fully automatic production with a stepped advance of the material and complete machining of the workpiece over its entire length without a second clamping, but on the other hand, owing to incomplete guidance of the material bar, the known feeding devices are unable to avoid vibrations and impact at high rotational speeds, and naturally have a detrimental effect on the machining accuracy.

The prior art already discloses a feeding system for barstock material on turning machines with a support extending in the feed direction and along which said support a plurality of retaining means for a material bar are slideably guided (Dr. Ing. Helmut Jager, DREHAUTOMATEN, published by Carl Hanser Verlag, Munich 1967, pp. 277 and 278). The retaining means are constructed as cross-members which are provided with guide bushes, extend between two guide rods and are slideable in the feed direction and, with the exception of the cross-member which trails in the feed direction, the middle region of each of which is provided with an interchangeable, ball bearing bush adapted to the material diameter, for retaining and guiding a material bar, while the middle region of the last cross-member is provided with a female taper which bears against the rear end of the material bar that is to be advanced. Furthermore, a pull rope or the like, extending forward in the direction of the turning machine is also attached to the rearmost cross-member and passes over reversing rollers to a weight which pulls the said cross-member to the front. When a material bar is worked, this weight pulls the rearmost cross-member in the forward direction after the workpiece collet in the turning machine has opened, while the remaining cross-members initially remain stationary until the rearmost cross-member bears upon the cross-member disposed in front and entrains the latter, and so on, until all cross-members have reached their front limiting position and bear upon each other. This known feeding system suffers from various disadvantages: Owing to the required guidance length of the guide bushes, the cross-members, pushed together in the feed direction, occupy a relatively large amount of space, which has a detrimental effect on the structural length of known feeding devices; in the course of working a material bar the cross-members assume different distances from each other so that the unguided bar portions are of different length; the female taper of the rearmost cross-member which bears against the rear bar end calls for a feed collet in the turning machine, since otherwise it would not be possible to advance the barstock portion which remains when all cross-members bear upon each other; the pull rope, extending above the cross-members, obstructs loading of the feeding system with a new material bar and finally, the cross-members must be manually pulled apart and set approximately to identical distances from each other after the feeding system has been loaded with a new material bar.

It is the object of the invention to improve the described and known barstock feeding system so that it is possible to dispense with the guide bushes which are provided on the cross-members of known construction, so that the retaining means can therefore be pushed together more closely and the feeding system can be built to a shorter length. Proceeding from a feeding system with a support, along which a plurality of retaining means for a material bar are slidingly guided, this problem is solved in accordance with the invention in that the retaining means are joined to each other, at least in pairs, by coupling devices and the latter are so constructed as to maintain retaining devices associated with one pair parallel to each other and all material bar retaining means can be closedly pushed together.

Owing to the presence of the coupling devices it is sufficient in the feeding system according to the invention to place the retaining means on guide rails or the like, since the said retaining means need only provide support but need not be maintained parallel with each other, since this function is performed by the coupling devices. The simplest and therefore specially recommended embodiment is one in which the coupling device comprises at least two intersecting jointed links, which are pivoted to each other and are so arranged that they can be pushed together and apart in the feed direction as is the case in the individual sections of so-called "lazy tongs". To ensure that the barstock sections between the individual retaining means, which guide the material bar, are always at least approximately of the same length, while a material bar is being machined, the invention proposes that all retaining means be connected to each other by coupling devices and the latter be so constructed that sliding of one retaining means causes the distances between the retaining means from each other to be positively altered in the same sense and at least approximately to the same extent as is the case in so-called "lazy tongs", which form the coupling devices of a particularly preferred embodiment of the feeding system according to the invention. In a construction of this kind it is immaterial which of the retaining means is moved by means of a drive in order to move the retaining means together into a stack prior to loading the feeding system with a new material bar or to uniformly distribute the said retaining means along a newly inserted material bar.

To ensure that the retaining means always have approximately the same distances between them and displacement of one retaining means alters the distances between the retaining means positively in the same sense at least approximately to the same extent, it is possible for the retaining means according to the invention to be connected to each other, for example by coupling means in the manner of a block and tackle; it is also conceivable to provide successive retaining means with pinions having a uniformly diminishing number of teeth and which are adapted to mesh with a slideable gear rack which extends in the feed direction and to drive shafts, which are rotatably supported by the retaining means and moreover have pinions of equal size adapted to mesh with a further gear rack, so that displacement of the movable gear rack causes the retaining means to move towards the turning machine at a speed which diminishes from the rearmost to the frontmost retaining means, when the material bar is advanced. It is however obvious that the "lazy tongs" represents a simpler and therefore more convenient solution.

The preceding reference to the fact that the coupling devices according to the invention keep the retaining means parallel with each other must not be understood in a restrictive sense indicating that the retaining means must be approximately plate-shaped, but the reference is merely intended to indicate that the coupling devices ensure a specific orientation for the retaining means.

Fundamentally, it would be possible for the retaining means to be advanced and to be pushed together by the material bar which advances during working, for example by connecting the material bar end rotatably to the rearmost retaining means but non-slideably in the feed direction, but it is more convenient for the retaining means not to be pushed together by means of the material bar but to provide a separate drive for at least one of the retaining means which said drive can be a spring drive or a motor drive. By contrast to the initially explained known feeding system there is a free choice of the driven retaining means in the design according to the invention.

If it is intended to machine barstock of circular cross-section, it is possible for the retaining means to be constructed in the manner of a lathe steady, i.e. three rollers would be sufficient for each retaining means to accommodate the material bar between them. However, if it is intended to process barstock with a polygonal section it is recommended to provide the retaining means with material bar sockets which are rotatably supported in said retaining means and the material bar is retained in said socket so as to be longitudinally slideable. Perfect round running is obtained if the diameter or even the shape of the internal aperture of the said sockets is adapted to the material bar cross-section, even in the case of polygonal bar stock.

In order to suppress noise and to absorb vibrational movements of material bars which are not absolutely straight, the bearings for the sockets in one preferred embodiment of the design according to the invention are attached to the retaining means with the interposition of a spring element, more particularly one which functions as a damper.

To enable the new material bar to be brought into alignment with the work spindle of the turning machine and with the apertures of the retaining means when the feed system is loaded it is also proposed that in addition for the retaining means, which are pushed together in the feed direction for the loading operation, supports are provided in serial configuration for the bar stock and these supports can be moved out of the path of the retaining means when these are pulled apart and more particularly are automatically pivoted away by the leading retaining means.

To enable the residue of a material bar to be advanced to the turning machine even when the retaining means holding such residue have been pushed fully forwards, a follow-up rod engages from the rear into the retaining means which is the last in the feed direction, and said follow-up rod bears in the region of the rearmost or—although less advantageous—another retaining means against the rear end of a material bar and can be pushed forward together with the said retaining means. This not only satisfies the previously-explained purpose but also ensures that the follow-up rod always bears against the rear end of the material bar and the latter cannot project in cantilevered manner from one of the retaining means to be exposed to the risk of kinking at high rotational speeds. The possibility provided by the invention, of pushing the retaining means more closely together than is possible with the prior art, also results in a relatively short follow-up rod.

Pulling apart and sliding the retaining means upon a new material bar as well as pushing back all retaining means prior to loading the feed system can be accomplished in the simplest manner in that the retaining device which leaves in the feed direction, can be driven in both directions. In one preferred embodiment, controllable drive for the leading and rearmost retaining means as well as for the follow-up rod or its support are provided to push together the retaining means in the course of working a material bar and for pushing a material bar residue through the stack formed by the retaining means.

The feeding system according to the invention is also suitable for multispindle automatic lathes and a separate system comprising retaining means and coupling devices is conveniently provided for each of the work spindles.

The feeding device according to the invention can also be used for machine tools other than turning machines, for example for sawing machines etc.

Further features, advantages and details of the invention are disclosed in the description hereinbelow of two particularly suitable embodiments of the feeding system according to the invention which are illustrated in the accompanying drawings in which.

Figure 1:
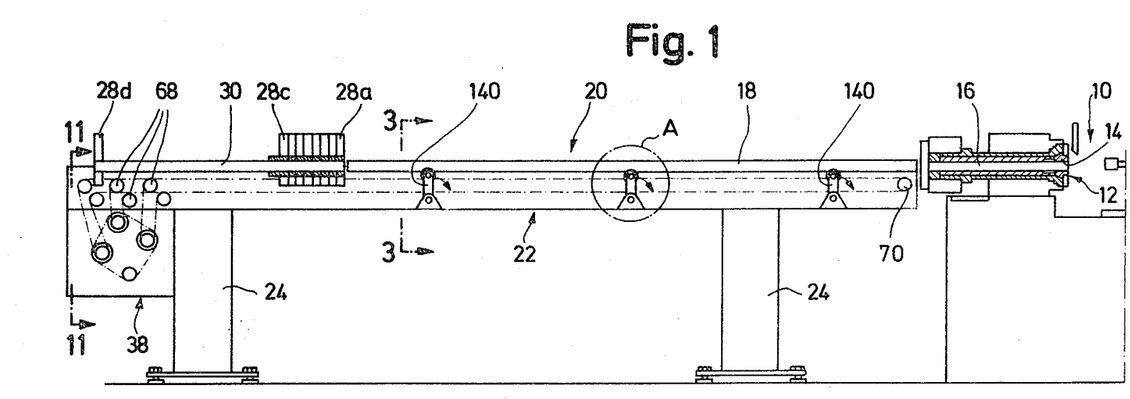
FIG. 1 is a side view of a first feeding system for a single spindle turning machine, immediately after being loaded with a new material rod.
Figure 2:
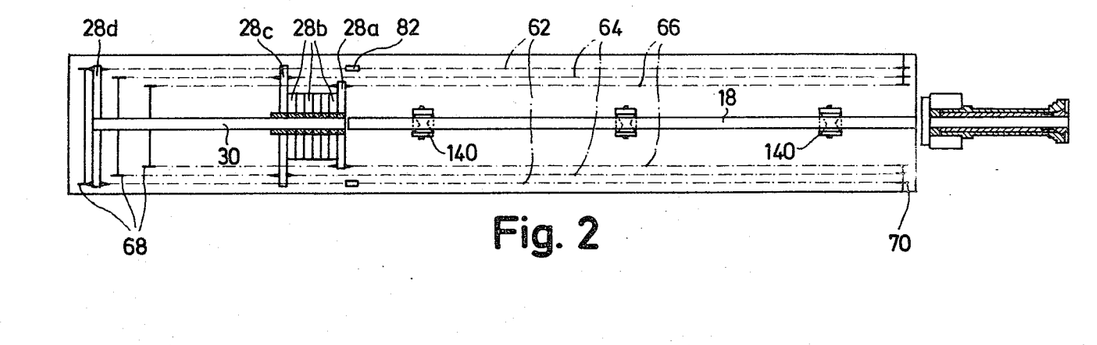
FIG. 2 is a plan view of the feeding device in the state illustrated in FIG. 1.

FIGS. 1 and 2 indicate a turning machine 10 with a work spindle 12 which surrounds a collet chuck 14 and is provided with an opening 16, coaxial with the spindle axis, through which a material bar 18 can be pushed from the rear, i.e. from left to right according to FIGS. 1 and 2, through the work spindle 12.

Figure 8:
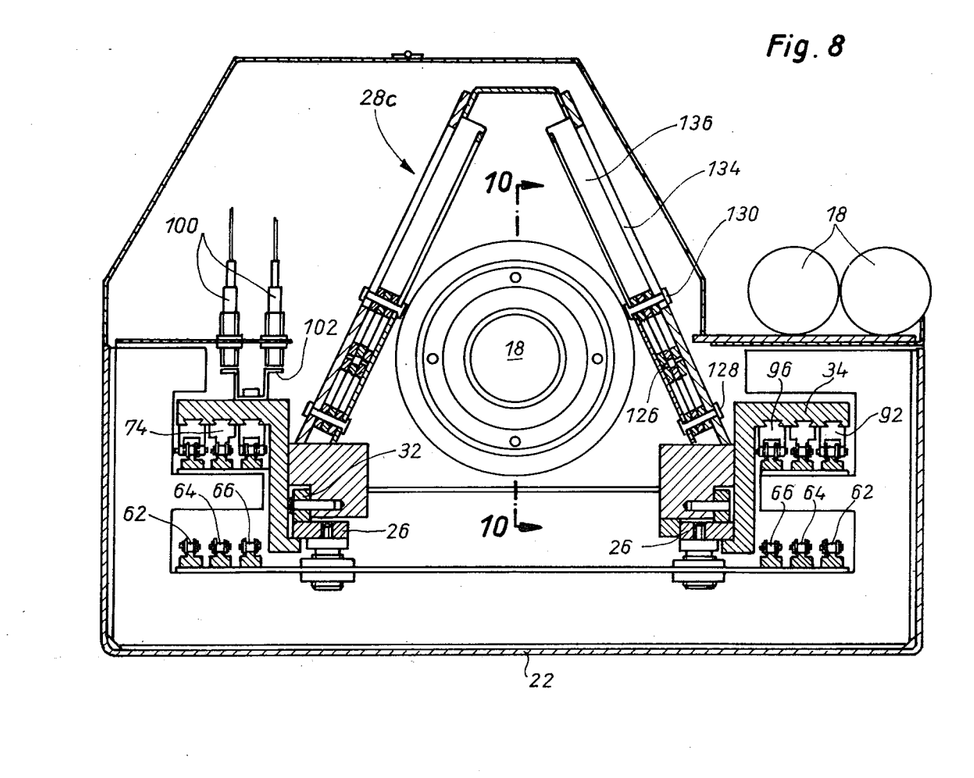
FIG. 8 is a section along the line 8—8 of FIG. 6.

The feeding system 20 according to the invention, illustrated in FIGS. 1 to 3 and 8 comprises a box-shaped hollow girder 22 which bears on supports 24 which are fixedly mounted on the floor. Stationary guide beams 26 are adjustably mounted in the said hollow girder 22 so as to extend in a direction which is parallel with the axis of the work spindle. A plurality of plate-shaped retaining means, referred to hereinafter as bearing plates, bear on the said guide beams, namely a front bearing plate 28a, middle bearing plates 28b, constructed as intermediate bearings, and a rear bearing plate 28c, together forming a set, as well as a bearing plate 28d in which a follow-up rod 30 is mounted (see more particularly FIGS. 1 and 2). As can be seen in FIG. 8, in which the rearmost bearing plate 28c was illustrated as an example for all bearing plates, the said bearing plate is provided with rollers 32, bearing on guide beams 26, and outriggers 34, which partially surround the guide beams 26 and thus provide lateral guidance for the bearing plates. All bearing plates can thus be pushed forwards and backwards in the direction of the work spindle axis.

Figure 11:
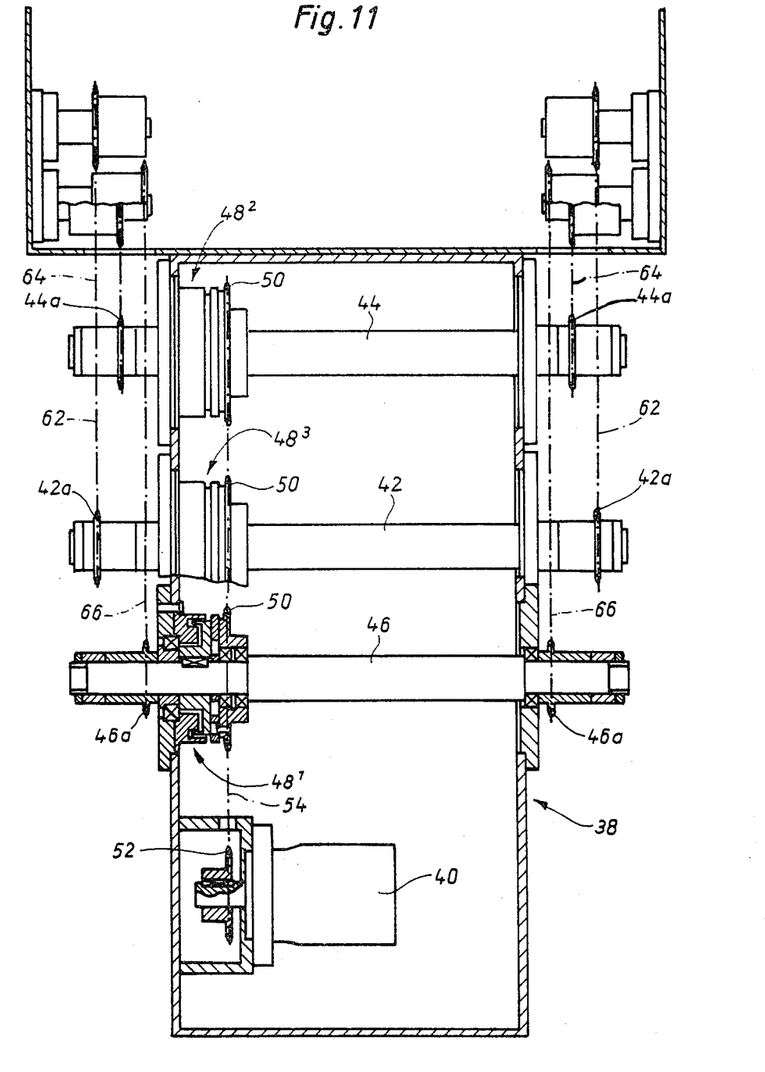
FIG. 11 is a section along the line 11—11 of FIG. 1 through the drive housing of the feeding device illustrated therein.

Beneath the hollow girder 22 and adjacent to the support 24 there is provided a drive housing 38 which accommodates a motor 40 (see also FIG. 11) and in which three shafts 42, 44 and 46 are supported. Each of the said shafts is associated with a controllable clutch 48, the input side of which is provided with a chain sprocket wheel 50 which is rotatably supported on the associated shaft 42, 44 or 46 and a common chain 54 passes over the said chain sprocket wheel 50 and over the chain sprocket wheel 52 of the motor 40. On the output side, the clutches 48 are non-rotationally joined to the associated shaft 42, 44 or 46 and each of the said shafts is provided at both ends with chain sprocket wheels 42a or 44a or 46a for pairs of driving chains 62 or 64 or 66 which pass over jockey wheels 68 and reversing wheels 70, shown in FIG. 1, in addition to passing over the above-mentioned chain sprocket wheels. As disclosed by FIGS. 2, 6 and 7, the chains 62, disposed on the outside of the plan view, are fixedly joined to the bearing plate 28d for the follow-up rod 30, the middle chains 64 are fixedly joined to the rear bearing plate 28c and the internally disposed chains 66 are fixedly joined to the leading bearing plate 28a. Connecting members 74, attached to the outriggers 34 and to one of each of the chain links, as shown in FIG. 8, are provided to this end.

Figure 6:
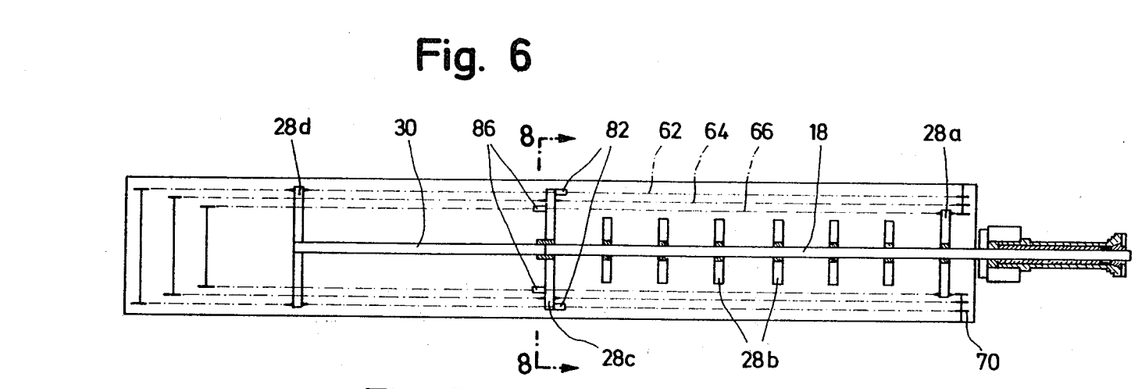
FIG. 6 is a view of the feeding system according to FIG. 2 but after the retaining means have been pulled over the newly inserted material bar.
Figure 7:
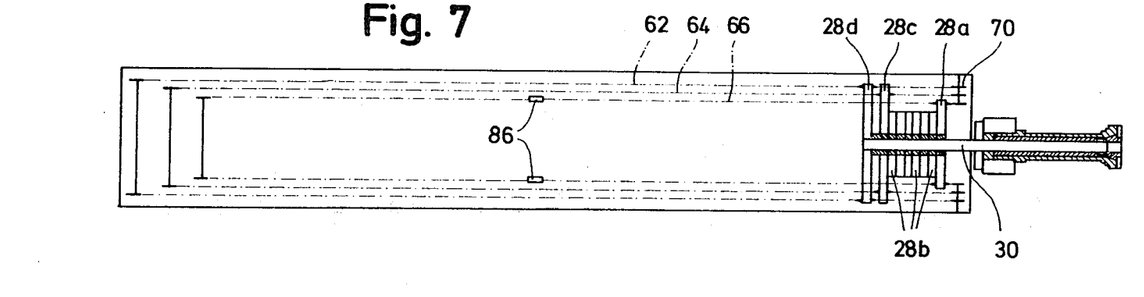
FIG. 7 is a view corresponding to FIG. 2 and 6 but after a material bar has been completely worked.

As can be seen most readily by reference to FIG. 6 the outer and inner drive chains 62 or 66 are provided with stop members 82 or 86 which co-operate with drivers 92 or 96, fixedly mounted to the outriggers 34 of the rear bearing plate 28c—these drivers are also shown in FIG. 8—and the drivers 92 are associated with the stop abutment members 82 and the drivers 96 are associated with the stop abutment members 86.

Selected retaining means, i.e. bearing plates in the specific case, are also associated with tracers to trigger specific operation when the said retaining means have reached a predefined position. This applies more particularly to the front and rear bearing plates of the stack of bearing plates and to the bearing plate for the follow-up rod. In the illustrated embodiment, this idea can be embodied by providing limit switches 100 to specific places of the hollow girder 22 and said limit switches are controlled by switch tags 102 which are attached to outriggers 34 of the selected bearing plate.

Figure 10:
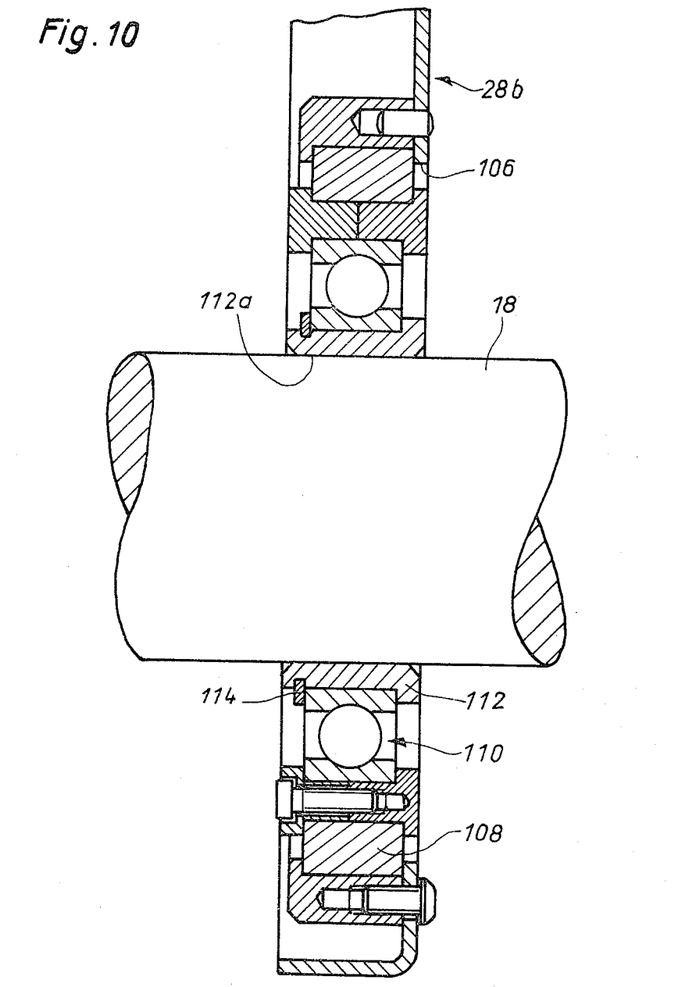
FIG. 10 is a section through the socket of one other retaining means along the line 10—10 of FIG. 8.

The construction of the bearing plates 28a, 28b and 28c will be explained by reference to FIG. 10 using the example of one of the bearing plates 28b. Said plates have a central opening 106 in which a reducing bush 112 is retained by means of a rubber elastic intermediate ring 108 and a ball bearing 110, all readily exchangeable in accordance with the invention. In the illustrated embodiment the distance provided by one circlip 114 is sufficient to enable the reducing bush 112 according to FIG. 10 to be removed to the right. The said reducing bushes have an internal aperture 112a whose cross-sectional shape corresponds to that of the material bar 18 which is to be processed and in which the cross-sectional dimensions are only slightly larger than those of the material bar 18, so that the latter can slide in the reducing bushes.

Figure 9:
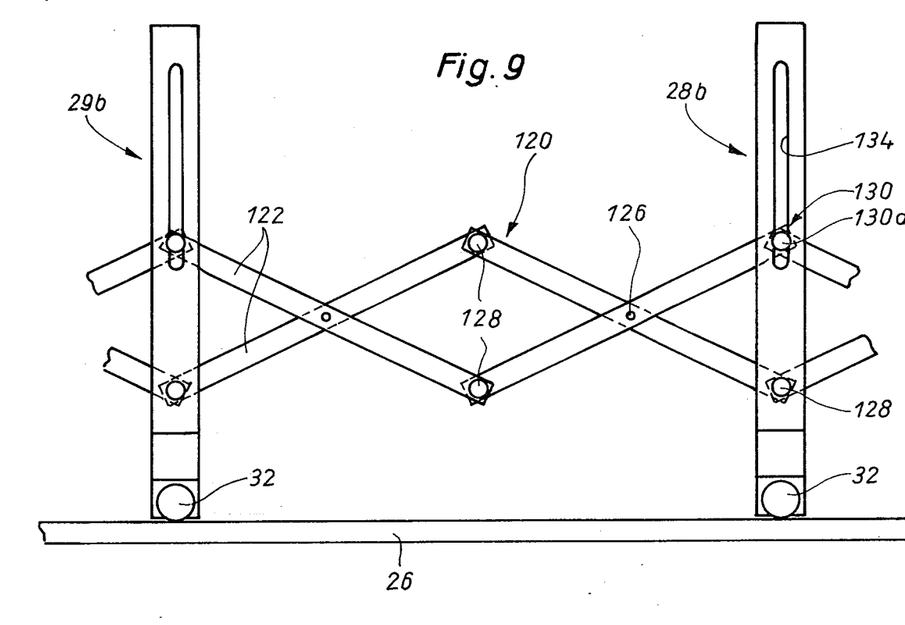
FIG. 9 is a side view of two retaining means and of the "lazy tongs" portion which acts as coupling device and interconnects the said retaining means.

FIGS. 8 and 9 will be used to explain the manner in which, in the preferred embodiment, the bearing plates 28a, 28b and 28c, combined into a set, are coupled to each other in accordance with the invention so that the bearing plates are retained precisely perpendicularly to the feed direction and sliding of one of the bearing plates positively causes the distances between the bearing plates to be altered uniformly and in the same sense. This will also be described by reference of two of the middle bearing plates 28b.

Each of the bearing plates 28a, 28b and 28c is connected to two "lazy tongs" 120, disposed on both sides of the bearing plate stack. As is well known, such "lazy tongs" comprise pairs of link joints 122 and in the illustrated embodiment each of the "lazy tongs" is provided with two pairs of joint links between two adjacent bearing plates although it is possible to provide only one pair of joint links or more than two pairs of joint links. As clearly shown by FIG. 8, the two "lazy tongs" of the preferred embodiment are constructed in three layers, which is particularly advantageous. The jointed link 122 of one pair of jointed links are connected to each other by means of a middle joint 126; furthermore, the jointed links of adjacent pairs of jointed links are connected by means of intermediate joints 128 between the bearing plates while the jointed link ends nearest to the bearing plates are pivotably connected to the bearing plates and to each other by means of joints 128 and 130. Advantageously, one of the joints, for example the bottom joint 128, is hinged to the associated bearing plate while the other joint 130 is slideably guided on the bearing plate, to which end the joint pin 130 engages with a guide slot 134 of the bearing plate.

As shown by FIG. 8, the two "lazy tongs" are disposed in lateral recesses 136 of the bearing plate, in accordance with a further feature of the invention.

According to the invention, the illustrated embodiment features foldable collapsible supports 140 to hold a material bar 18, newly introduced into the feeding system 20, before the bearing plates 28a to 28c have been pushed over the new material bar, and in their operative position the said collapsible supports hold the material bar 18 so that it aligns with the apertures 112a of the bearing plates and the openings 16 of the collet chuck 14 (see more particularly FIGS. 1 and 2). These folding support will be explained in detail by reference to FIGS. 1, and 3 to 5.

Figure 3:
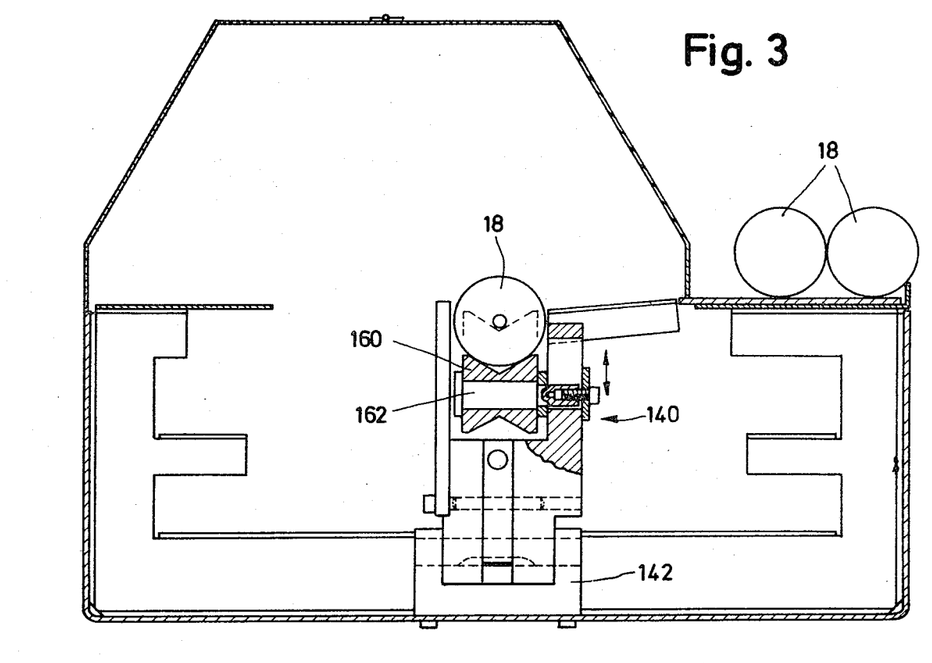
FIG. 3 is a section through the feeding device along the line 3—3 of FIG. 1 and this illustration has been simplified as far as possible since it is only intended to illustrate the support on which a freshly supplied material rod is placed.
Figure 4:
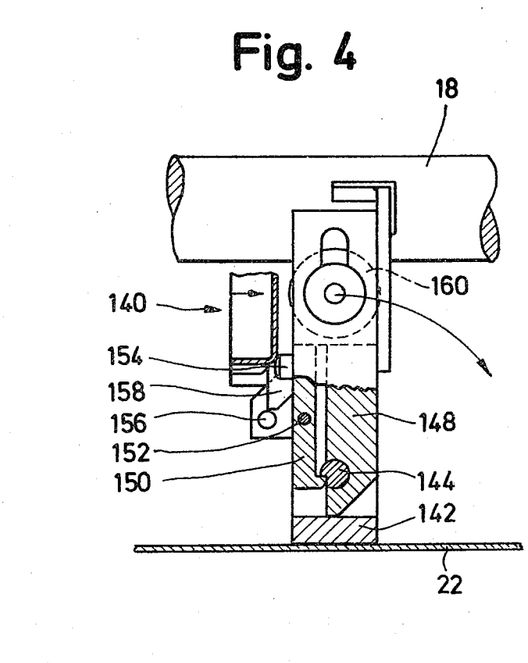
FIG. 4 shows the section A of FIG. 1 to an enlarged scale.

A bearing pedestal 142 is mounted at the bottom of the hollow girder 22 and retains a shaft 144 with a ratchet recess 146. A stand 148, on which a rachet lever 150 is pivotably mounted, can be pivoted about the said shaft so that the said lever engages the ratchet recess 146 in the position shown in FIG. 4. The top end of the rachet lever, which can be pivoted about a pin 152, is provided with a stop abutment 154 and the ratchet lever 150 is also provided on the side with a driver 156 which projects into the path of a cam 158 mounted on the front bearing plate 28a, when the folding support is pivoted down (see FIG. 5). Finally, a prismatic support roller 160 is rotatably supported on a shaft in the top region of the stand 148 and can be adjusted in the vertical direction as indicated in FIG. 3.

The first embodiment of the feeding system according to the invention as illustrated in FIGS. 1 to 11 will first be explained. In order to differentiate between the three clutches 48 they are designated in FIG. 11 with the primed numerals 1-3.

Before the feeding system is loaded with a new material bar 18 the bearing plates 28a to 28d must first be moved into their starting positions in accordance with FIGS. 1 and 2; the manner in which this is achieved will be explained subsequently. The material bar 18 is then placed manually or by means of an automatic loading device, not shown, on the support rollers 160 of the erected folding supports 140. This state is indicated by FIGS. 1 and 2. Thereafter, the motor 40 is set to clockwise rotation by known control means and the clutch 48' is engaged so that the drive chains 66 entrain the leading bearing plate 28a to the front and thus pull the bearing plate stack 28a, 28b, 28c apart and pull it over the material bar 18. In the case of polygonal stock and apertures 112a which are not circular, it is essential to ensure that the reducing bushes 112 of the bearing plates are correspondingly aligned. While the leading bearing plate 28a is pulled into its leading limiting position, illustrated in FIG. 6, the stop abutment members 86, mounted on the inner drive chain 66, entrain the rear bearing plate 28c which in turn entrains the outer drive chains via the stop abutment members mounted on the outer drive chains 62 and said outer drive chains entrain the bearing plate 28d for the follow-up rod 30. The stop abutment members 82 and 86 are attached so that the bearing plates 28c and 28d assume the positions illustrated in FIG. 6 when the leading bearing plate 28a has reached its front limiting position; in this state and according to the invention, the follow-up rod 30 and the material bar 18 are both situated in the rear bearing plate 28c or more accurately in the reducing bush 112 thereof and bear upon each other as indicated in FIG. 6. It should be added that the clutches 48" and 48'" are disengaged during this operation.

While distribution of the bearing plates along the material bar 18 can be performed by fast approach motion, the material bar is advanced in the turning machine at a lower feed rate during working. To this end and after disengagement of the clutch 48', the rotational speed of the motor 40 is reduced and the clutch 48" is engaged so that the driving chains 64 pull the rear bearing plate 28c and the bearing plate 28d with the follow-up rod 3 in synchronism to the front via the stop abutment members 82 and the driving chains 62. The distances between the bearing plates 28a, 28b and 28c diminish progressively and uniformly by virtue of the "lazy tongs" until all the said bearing plates have reached their front limiting positions and bear upon each other.

Figure 5:
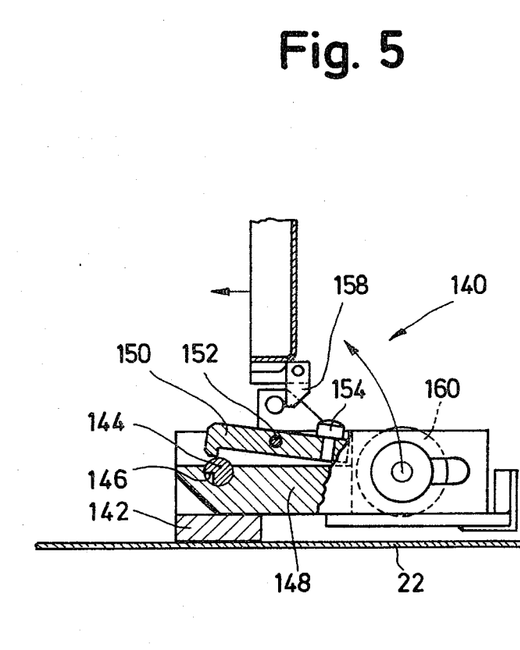
FIG. 5 is a view of the support shown in FIG. 4 with the said support in its inoperative position.

It should also be added that when the front bearing plate 28 is pulled forward it moves against the stop abutments 154 of the folding supports 150, lifts the ratchet levers 150 from the ratchet recesses 146 and thus causes the folding supports 140 to be folded into the position shown in FIG. 5.

When the rear bearing plate 28c has reached its front limiting position it triggers the following operations via one of the limit switches 100. The clutch 48" is disengaged while the clutch 48'" is engaged so that the outer driving chains 62 are driven to pull the bearing plate 28d into its front leading position shown in FIG. 7, so that the residue of the material bar 18 is pushed by the follow-up rod 30 through the work spindle 12 and can be completely used up. After the bearing plate 28d has reached its front limiting position, one of the limit switches 100 disengages the clutch 48'" and switches the motor 40 to anticlockwise rotation, namely in fast approach motion. Simultaneously, the clutch 48' is engaged so that the inner drive chains 66 pull the front bearing plate 28a and therefore all remaining bearing plates 28b, 28c and 28d to the rear until the bearing plate stack 28a, 28b, 28c has reached the rear limiting position shown in FIGS. 1 and 2. One of the limit switches then again disengages the clutch 48' and engages the clutch 48'" so that the drive chains 62 entrain the bearing plate 28d into its rearmost limiting position shown in FIG. 2; with the bearing plate 28d in this limiting position, the clutch 48'" is again disengaged via one of the limit switches and the motor 40 is switched off.

As can be seen by FIG. 5, the cam 158 of the leading bearing plate 28a, which has been moved back, erects via the driver 156 the stand 148 of each of the folding supports 140 which it passes, so that the ratchet levers 150 drop into the ratchet recesses 146 and lock the folding supports in their upright position.

FIGS. 12 to 15 show a second embodiment which is particularly suitable for multispindle automatic lathes, the illustrated example being intended for a six spindle automatic.

Figure 12:
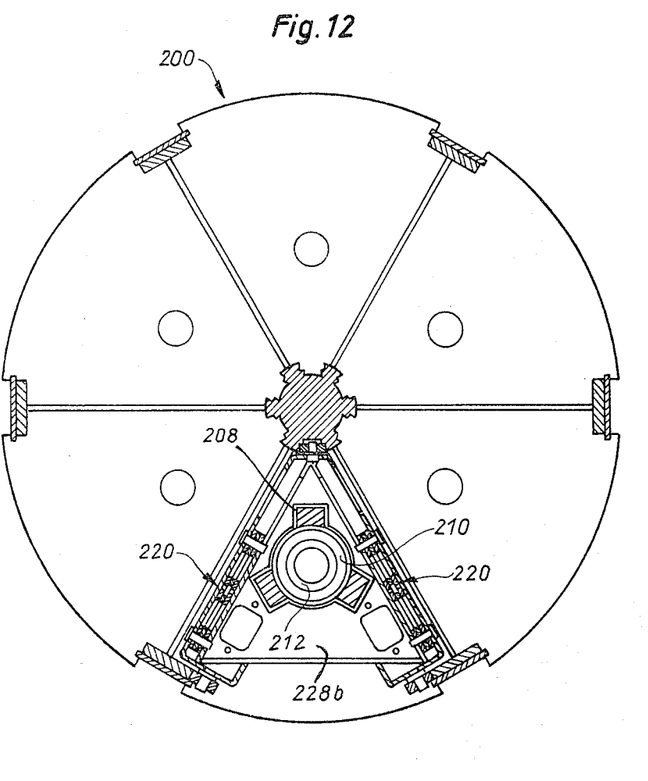
FIG. 12 is a simplified section at right angles to the feeding device through a second embodiment for a multispindle turning machine.

As can be seen by reference to FIG. 12, the hollow girder 22 of the first embodiment and the components contained therein are replaced by a feeder system, referenced in its entirety with the numeral 200 and containing for each of the work spindles of the turning machine a system whose function substantially corresponds to the feeder system 20 of the first embodiment. The feeder system 200 will therefore be explained merely in brief form.

FIG. 12 therefore only shows one of the systems in detail and the illustration corresponds to that of FIG. 8 for the first embodiment. In this case, the illustrated middle bearing plate 228b is provided with a reducing bush 212 which is retained in the bearing plate 228b by means of a ball bearing 210 and rubber elastic spring elements 208. FIG. 12 also shows two "lazy tongs" 220 which are connected in identical manner to the bearing plates as is the case for the "lazy tongs" 120 and the bearing plates 28a, 28b, 28c and 28d of the first embodiment.

Figure 13:
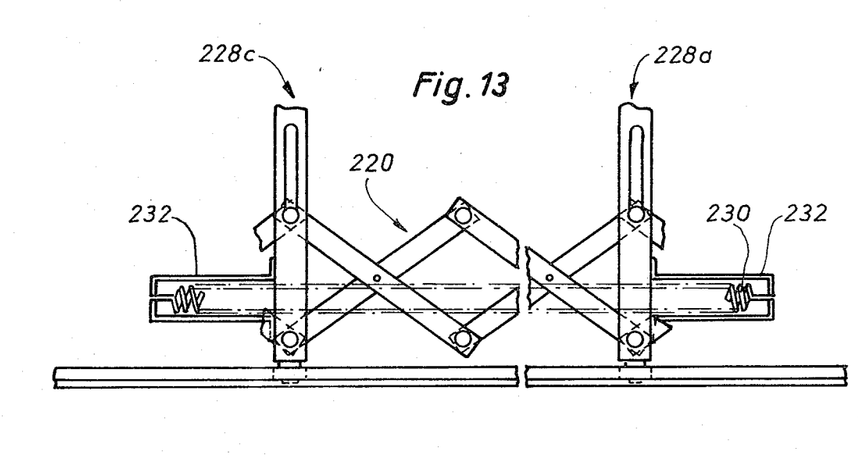
FIG. 13 is a view of part of the second embodiment in accordance with FIG. 9.

By contrast to the first embodiment however, tension springs 230 are provided which engage via spring pads 232 on the front and rearmost bearing plate 228a or 228c respectively of the bearing plate set and tend to push this set together into a stack (FIG. 13).

Figure 14:
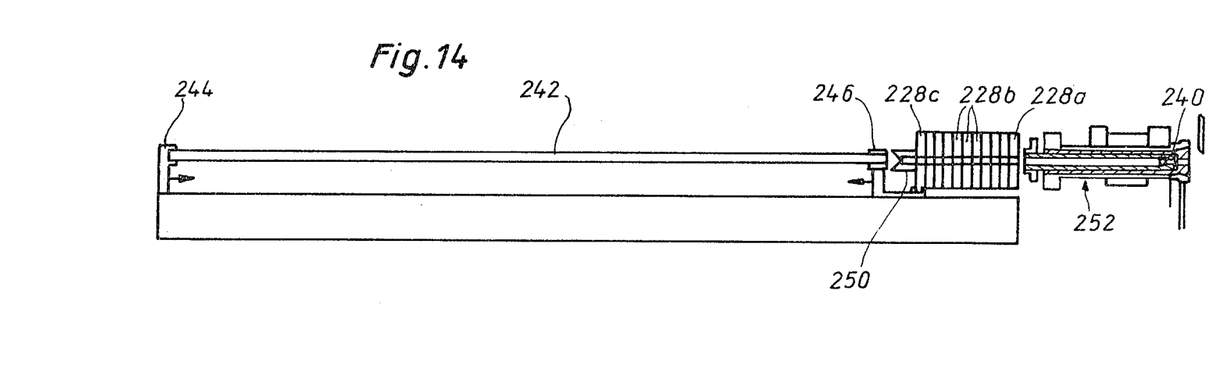
FIG. 14 is a simplified diagrammatic side view of the feeding device associated with one of the work spindles, immediately after loading with a new material bar
Figure 15:
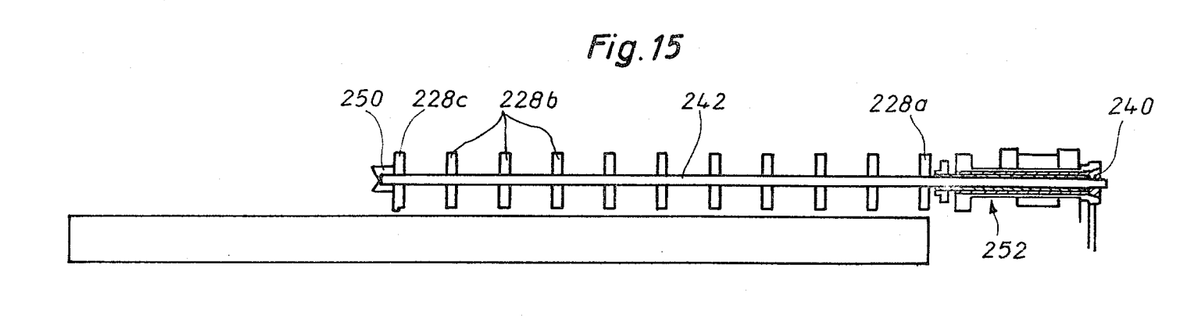
FIG. 15 is a view corresponding to FIG. 14 but after the retaining means have been pushed over the new material bar and the latter have been introduced into the associated work spindle.

This system is particularly suitable for automatic turning machines in which the bar stock feed is provided by feed collets 240 one of which is shown in FIGS. 14 and 15. This therefore dispenses with the need for an equivalent of the follow-up rod 30 of the first embodiment.

FIG. 14 shows the state of one system of the feed system 200 after the automatic loading with a new material bar 242 which is initially held between supports 244 and 246 for as long as the bearing plate 228a to 228c are still pushed together into a block.

The rearmost bearing plate 228c is provided in accordance with the invention with spring pawls 250 which can be pulled to the rear over the new material bar 242 either manually or automatically while at the same time the material bar is pushed forward into the associated work spindle 252 of the automatic turning machine. The support 246 together with the rearmost bearing plate 228c is pushed to the rear and the support 244 together with the material bar 242 is pushed to the front, namely by means not shown, but which correspond to the drive chains 64 and 62 of the first exemplified embodiment. The spring pawls 250 finally snap together behind the left-hand end of the material bar 242 as indicated in FIG. 15 so that they always bear against the rear material bar end due to the action of the tension springs 230. According to the invention therefore the tension springs 230 not only ensure that the bearing plates of the bearing plate set are pushed together while the material bar 242 is progressively worked, but also that it is never possible for a cantilevered bar end to project beyond the rearmost or any of the other bearing plates, although the bar feed is obtained by a feed collet which does not form part of the feeding system.

In preferred embodiments of the feeding system according to the invention, the retaining means for the barstock have a distance of approximately 300 to 400 mm from each other in the extended state and this distance changes uniformly throughout in the course of working of one material bar.

I claim:

1. A feeding system for barstock on turning machines, said system having support means extending in the feeding direction, at least three holders for holding and slideably guiding a length of said barstock, said holders being carried by said support means for sliding movement in the feeding direction, and coupling means interconnecting the holders for moving the holders close together and apart, characterized in that said coupling means are in the form of guiding means (122, 126, 128, 130) comprising rigid elements for maintaining said holders (28a, 28b, 28c) parallel to each other and for synchronously driving the holders together and apart and maintaining equidistant interholder spacing.

2. System according to claim 1, characterised in that all retaining means (28a, 28b, 28c) are interconnected by such coupling devices (122).

3. System according to claim 1 or 2, characterised in that a coupling device is provided with at least two intersecting links (122), which are pivoted to each other and to permit the coupling device can be pushed together and expanded in the feed direction.

4. System according to claim 3, characterised in that of the link ends, which are associated with retaining means (28a, 28b, 28c), at least one is not only pivotable with respect to the retaining means but is also slideable along the longitudinal orientation of the link.

5. System according to claim 1, characterised in that the retaining means (28a, 28b, 28c) are interconnected by so-called "lazy tongs" (120) as coupling device.

6. System according to claim 1 or 2, characterised by a drive (38) for at least one of the retaining means.

7. System according to claim 1, characterised in that the retaining means (28a, 28b, 28c) are provided with sockets which are rotatably supported in said rataining means and are intended for a material bar which is longitudinally slideably retained in said sockets.

8. System according to claim 7, characterised in that the bearings (110) for the sockets (112) are attached to the retaining means with the interposition of a spring element (108), more particularly an element acting as damper.

9. System according to claim 1, characterised in that supports (140) for the bar material (18) are provided for loading the feeding device when the retaining means (28a, 28b, 28c) are pushed together in the feed direction which said supports can be moved out of the path of the retaining means when these are pulled apart.

10. System according to claim 1, characterised in that a follow up rod (30) engages from the rear with the retaining means (28c) which trails in the feeding direction, which said rod can bear against the rear end of a material bar (18) and is movable in the feed direction together with the trailing retaining means (28c).

11. System according to claim 1, characterised in that the retaining means (28a), which lead in the feed direction, can be driven in both directions.

12. System according to claim 10 or 11, characterised in that controllable drives (48, 48', 48", 48''') are provided for the leading and trailing retaining means (28a or 28c) and for the follow-up rod (30).

13. System according to claim 1, characterised by the provision of a spring (230) for pulling together the retaining means (228a, 228b, 228c).

14. System according to claim 1 for multispindle automatic lathes, characterised in that a separate system comprising retaining means and coupling devices is provided for each of the work spindles (252).

* * * * *